United States Patent
Mueller et al.

[11] Patent Number: 6,140,914
[45] Date of Patent: Oct. 31, 2000

[54] VEHICLE SECURITY SYSTEM

[76] Inventors: Rand W. Mueller, 3160 Erie Dr., Orchard Lake, Mich. 48324; Thomas Lemense, 33025 W. Chicago Rd., Livonia, Mich. 48150; Robert J. Pizzuti, 1514 Porter Cir., Rochester Hills, Mich. 48308; Hilton W. Girard, 26284 Pinehurst, Roseville, Mich. 48066; Graham Fishman, 6664 Cottonfield Knoll, W. Bloomfield, Mich. 48322; Mark Cohrs, 21293 Chevalier Dr., Mt. Clemens, Mich. 48044; Jay N. Cullimore, 65 Woodside Dr., Oakland, Mich. 48363; Joseph Santavicca, 35326 Garret, Clinton Township, Mich. 48035; Todd Scott, 4830 Briarwood, Royal Oak, Mich. 48073; David Rupert, 494 S. Pinegrove, Waterford, Mich. 48327; Peter J. Stouffer, 8652 Sunset Cove, Clarkston, Mich. 48348; John Gillespie, 600 Greenhill, #923, Round Rock, Tex. 78664

[21] Appl. No.: 09/026,333

[22] Filed: Feb. 19, 1998

Related U.S. Application Data

[63] Continuation of application No. 08/624,146, Apr. 3, 1996, Pat. No. 5,805,056, which is a continuation of application No. 08/068,826, May 28, 1993, abandoned.

[51] Int. Cl.[7] .................................................. B60R 25/10
[52] U.S. Cl. ........................... 340/426; 340/429; 340/566
[58] Field of Search .................................. 340/426, 429, 340/555, 566, 556, 557, 552, 469, 550, 425.5, 428, 937, 384.4, 387.1; 348/148, 152

[56] References Cited

U.S. PATENT DOCUMENTS

| | | |
|---|---|---|
| 3,585,584 | 6/1971 | Behrend . |
| 3,614,734 | 10/1971 | Davis . |
| 3,668,675 | 6/1972 | Joens et al. . |
| 3,670,301 | 6/1972 | Douglas . |
| 3,703,714 | 11/1972 | Andrews . |
| 3,949,219 | 4/1976 | Crouse . |
| 3,987,408 | 10/1976 | Sassover et al. . |
| 4,143,368 | 3/1979 | Route et al. . |
| 4,159,467 | 6/1979 | Ballin . |
| 4,161,721 | 7/1979 | Conklin et al. . |
| 4,258,353 | 3/1981 | Carlson . |
| 4,383,242 | 5/1983 | Sassover et al. . |
| 4,471,343 | 9/1984 | Lemelson ................. 340/571 |
| 4,471,659 | 9/1984 | Udd et al. . |
| 4,511,886 | 4/1985 | Rodriguez ................. 340/531 |
| 4,535,333 | 8/1985 | Twardowski . |
| 4,584,569 | 4/1986 | Lopez et al. . |
| 4,595,902 | 6/1986 | Proske et al. . |
| 4,626,848 | 12/1986 | Ehlers . |
| 4,631,527 | 12/1986 | De Witt et al. . |
| 4,652,860 | 3/1987 | Weishaupt et al. . |
| 4,701,751 | 10/1987 | Sackett . |
| 4,719,460 | 1/1988 | Takeuchi et al. . |
| 4,754,255 | 6/1988 | Sanders et al. . |
| 4,794,368 | 12/1988 | Grossheim et al. . |
| 4,837,567 | 6/1989 | Kleefeldt et al. . |
| 4,845,464 | 7/1989 | Drori et al. ................. 340/429 |
| 4,857,912 | 8/1989 | Everett, Jr. et al. ......... 340/825.3 |
| 4,862,139 | 8/1989 | Fukamachi et al. . |
| 4,866,417 | 9/1989 | DeFino et al. . |
| 4,868,915 | 9/1989 | Anderson, III et al. . |
| 4,887,065 | 12/1989 | Robitschko et al. . |
| 4,940,964 | 7/1990 | Dao . |
| 4,942,393 | 7/1990 | Waraksa et al. . |
| 4,983,953 | 1/1991 | Page . |
| 4,990,906 | 2/1991 | Kell et al. . |
| 5,027,104 | 6/1991 | Reid ........................ 340/541 |

(List continued on next page.)

*Primary Examiner*—Brent A. Swarthout
*Assistant Examiner*—Davetta W. Goins
*Attorney, Agent, or Firm*—Chupa & Alberti, P.C.

[57] ABSTRACT

A vehicle security system 10 having a sensor 28 which selectively produces output signals based upon a threshold signal comparison, which automatically deactivates upon the presence of transmitter 20, and which may be used in combination with an existing vehicle security system 106.

2 Claims, 11 Drawing Sheets

U.S. PATENT DOCUMENTS

| | | | |
|---|---|---|---|
| 5,047,629 | 9/1991 | Geist | 250/231.1 |
| 5,049,867 | 9/1991 | Stouffer . | |
| 5,111,289 | 5/1992 | Lucas et al. | 358/108 |
| 5,113,182 | 5/1992 | Suman et al. . | |
| 5,132,660 | 7/1992 | Chen et al. . | |
| 5,134,392 | 7/1992 | Takeuchi et al. . | |
| 5,146,215 | 9/1992 | Drori . | |
| 5,159,334 | 10/1992 | Baumert et al. . | |
| 5,160,850 | 11/1992 | Spirig et al. . | |
| 5,204,672 | 4/1993 | Brooks . | |
| 5,225,672 | 7/1993 | Jones . | |
| 5,313,295 | 5/1994 | Taniguchi et al. | 348/149 |
| 5,315,285 | 5/1994 | Nykerk | 340/425.5 |
| 5,499,196 | 3/1996 | Pacheco | 364/552 |
| 5,534,845 | 7/1996 | Issa et al. . | |
| 5,682,133 | 10/1997 | Johnson et al. | 340/426 |
| 5,783,994 | 7/1998 | Koopman, Jr. et al. . | |
| 5,805,056 | 9/1998 | Mueller et al. | 340/426 |
| 5,900,823 | 5/1999 | Coll-Cuchi | 340/825.32 |

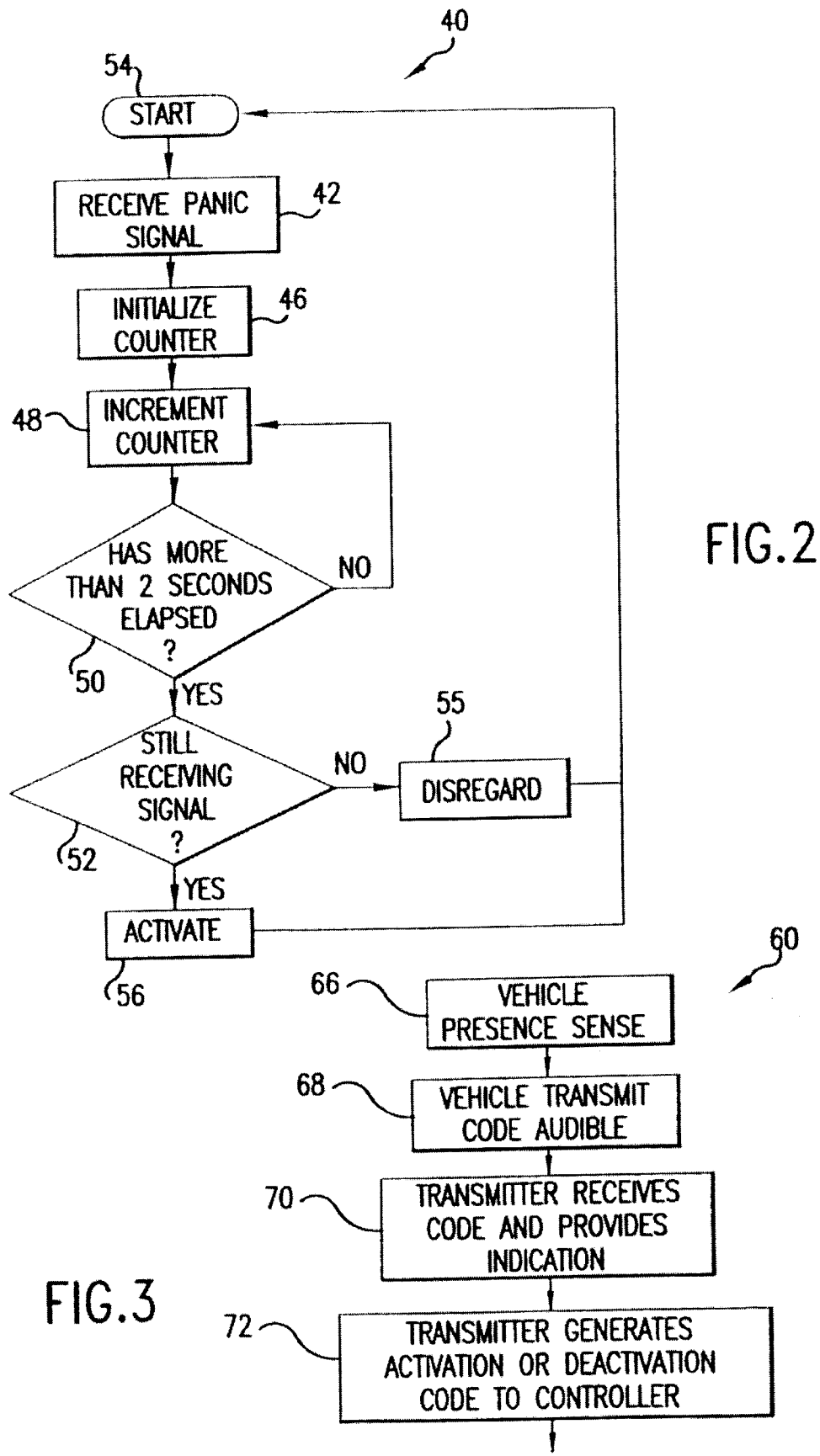

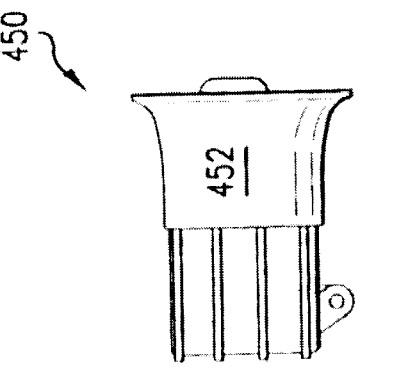
FIG.18
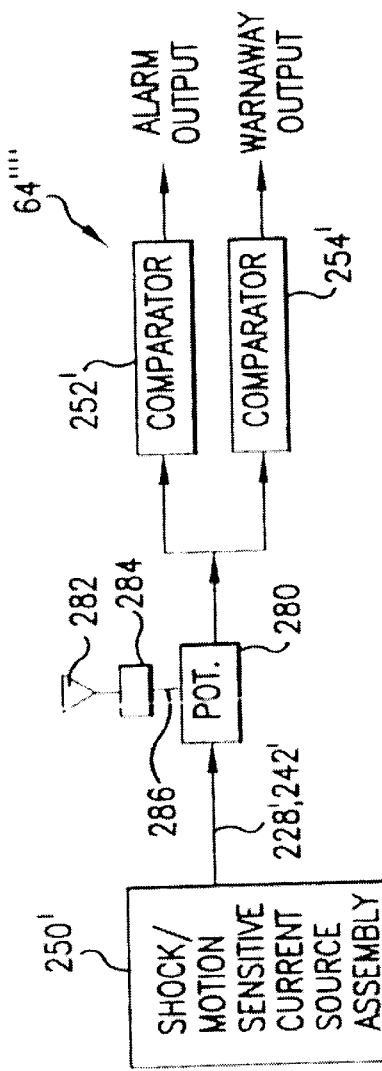
FIG.15
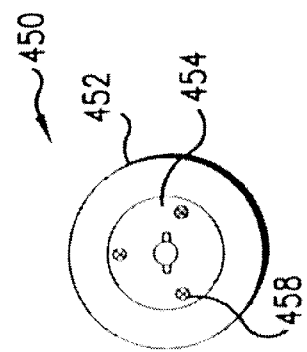
FIG.17
FIG.16

VEHICLE SECURITY SYSTEM

This application is a continuation of application Ser. No. 08/624,146, filed on Apr. 3, 1996 as U.S. Pat. No. 5,805,056 which is a continuation of application Ser. No. 08/068,826 filed on May 28, 1993, which is now abandoned.

FIELD OF THE INVENTION

This invention relates to a security system and more particularly to a vehicle security system which is adapted for use with a second and preexisting security system, which is adapted to be automatically activated and deactivated, and which is further adapted to acquire and selectively provide video data.

BACKGROUND OF THE INVENTION

Security systems are normally employed in vehicles to prevent theft and damage to the vehicle. Many of these systems selectively allow remote or "panic" siren activation if a threatening situation is encountered as the owner approaches or enters the vehicle. The loud noise emanating from the activated siren allows the owner to warn away or frighten potential assailants. While these prior systems selectively provide such "panic" alarms, they are prone to unintentional and undesirable siren activation causing unwanted audio disturbances to the surrounding area.

Furthermore, many of these systems only allow for manual system activation and/or deactivation, requiring the vehicle owner to hold and depress certain switches on a transmitter. Such manual operation is both inconvenient and dangerous. For example, should the owner be carrying a large number of grocery bags it becomes necessary for the owner to place the bags upon the car or ground while locating and holding the transmitter. Moreover, if the owner is being pursued and must enter the vehicle quickly, the need to locate and depress certain transmitter switches might cause the owner to fail to evade the pursuers.

Moreover, many of these prior systems provide only limited alarm functionality, thereby successfully preventing or deterring only a relatively small number of thefts while being easily disconnected or deactivated by a thief and providing an alarm only when the vehicle has actually been damaged.

Many of these prior system limitations are set forth in U.S. Pat. No. 5,049,867 ("the '867 patent") entitled "Vehicle Security Apparatus", which issued on Sep. 17, 1991, which is assigned to Applicant's assignee, and which is fully incorporated herein by reference. While the vehicle security apparatus described and claimed within the '867 patent provides a very useful system, some improvements which are described and claimed within this application have been added to this system in order to allow the system to be more adaptable to various user requirements and to further address many of the aforedescribed prior system limitations.

SUMMARY OF THE INVENTION

According to one aspect of the present invention a vehicle security system is provided.

According to a second aspect of the present invention a vehicle security system is provided and is adapted to be selectively responsive to a "panic" siren activation signal in a manner which is based upon the duration of the signal, effective to substantially prevent false alarm activations.

According to a third aspect of the present invention a vehicle security system is provided and, is adapted to be selectively and automatically activated and/or deactivated when a transmitter is brought in close proximity to the vehicle.

According to yet another aspect of the present invention a vehicle security system is provided and is adapted, for use with an existing vehicle security system and increases the functionality of the existing system.

According to yet another aspect of this invention a vehicle security system is provided and is adapted to selectively acquire and provide video data upon activation.

According to one aspect of the present invention a vehicle security system is provided. The security system includes controller means for receiving a signal for a certain period of time and for determining the duration of the certain period of time. The system further includes response means coupled to the controller means and adapted to be selectively activated by the controller means when the certain duration exceeds a predetermined threshold value.

According to a second aspect of the present invention a method is provided for use with a vehicle security system. The security system is adapted to receive a signal and, in response to the received signal, to become activated. The method comprises the steps of providing a threshold value; receiving the signal for a certain time period; comparing the certain time period to the threshold value; and activating the security system only if the certain time period exceeds the threshold value.

These and other features, objects, and advantages of the present invention will become apparent from reading of the following detailed description of the preferred embodiment and by reference to the claims taken in combination with the accompanying drawings.

BRIEF DESCRIPTION OF THE DRAWINGS

FIG. 2 is a flowchart illustrating the sequence of steps associated with determining whether to selectively activate various system components in response to a received "panic" signal;

FIG. 3 is a flowchart illustrating the sequence of steps associated with the automatic and selective activation and deactivation of the vehicle security system of the preferred embodiment of this invention;

FIG. 15 is a block diagram of a fourth shock sensor made in accordance with the teachings of this invention;

FIG. 16 is a block diagram of an alternate embodiment of the vehicle security system of this invention;

FIG. 17 is a front view of a siren made in accordance with the teachings of this invention;

FIG. 18 is a side view of the siren shown in FIG. 17;

DETAILED DESCRIPTION OF THE PREFERRED EMBODIMENT

Figure 1:
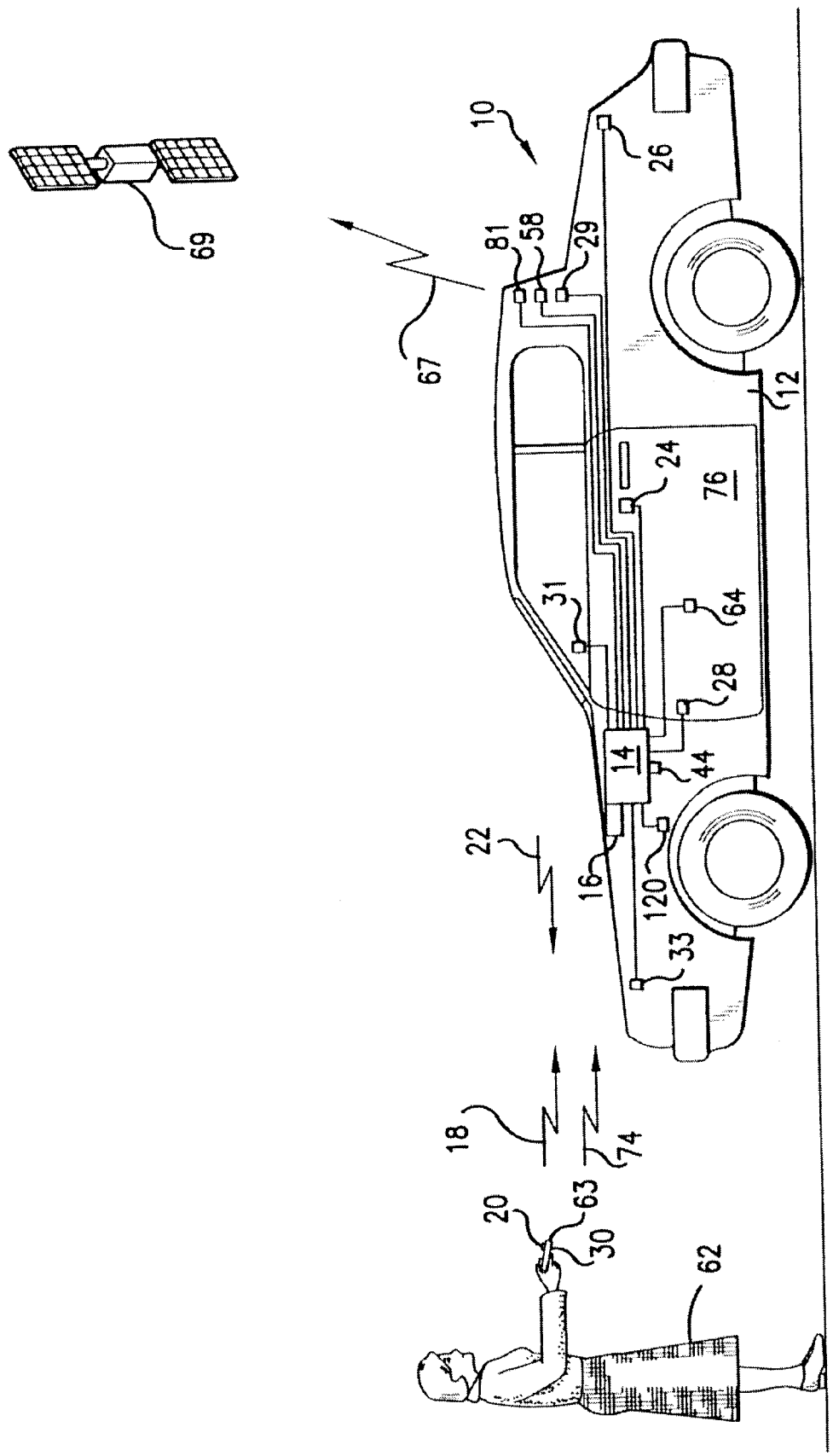
FIG. 1 is a block diagram of the vehicle security system of the preferred embodiment of this invention shown in assembled relation with a typical vehicle.

Referring now to FIG. 1, there is illustrated a vehicle security system 10 made in accordance with the teachings of the preferred embodiment of this invention and shown in assembled relation with a typical vehicle 12.

As shown, system 10 includes a microprocessor-based receiver/controller 14 operating under stored program control and having an antenna 16 which receives signals 18, 74 from a conventional electromagnetic signal generating typical transmitter 20 and which couples these signals to controller 14. These signals 18, 74 are generated by the depression of certain of the electromechanical switches 30 and are generated for a time period having a duration which is substantially similar to the length of time that the switches are depressed. As should be apparent to one of ordinary skill in the art, antenna 16 also allows signal 22 to be generated from receiver/controller 14. In the preferred embodiment of this invention, transmitter 20 is adapted to receive signal 22 and respond in a manner which will be explained. The use of signals 18, 22 and 74 will be explained with regard to the "panic" siren signal and other features of system 10. It should be realized by one of ordinary skill in the art that signals 18, 22, and 74 may comprise ultrasonic, sonic, light (i.e. infrared or ultraviolet), and/or radio and/or other electromagnetic frequencies.

As further shown, system 10 includes various alarm activation components or elements such as a door switch 24 a trunk lock 26, a "light-touch" sensor 28, a camera 29, a disarm switch 31, a visual alarm 58, a motion sensor 64, and sirens 33, 81. The operation of sensor 28, camera 29, and switch 31 will be discussed. Moreover, it should be realized by one of ordinary skill in the art that system 10, in one embodiment of this invention, includes the functionality described within the '867 patent and more particularly, receiver/controller 14 and transmitter 20 are respectively identical to receiver means 60 and transmitter means 10 as described and shown within the '867 patent. Moreover, it should further be realized that components 28, 29, 31, 33, 58, 64, and 81 may be placed in any convenient location within or upon vehicle 12.

The security system described within the '867 patent is adapted to receive a "panic" signal 18 and to energize visual alarm element 58 and activate siren 33. While effective, this system is receptive to "false" or unintentionally transmitted signals caused by the momentarily and unintended depression of certain transmitter switches 30. For example, if transmitter 20 were placed in a purse or pocket, objects included within the purse or pocket press against switches 30 causing the "panic" signal to be unintentionally generated. To prevent such false "panic" activation, panic subroutine 170 (described within the '867 patent) is modified in the preferred embodiment of this invention in accordance with the steps shown in flowchart 40 of FIG. 2.

Specifically, receiver/controller 14 receives the "panic" activation signal 18 in step 42 and initializes a counter 44 (as shown in FIG. 1), in step 46. Such initialization causes the counter to have a null or zero value. Counter 44 is incremented in step 48 while receiver 14, in step 50, continually monitors the counter to ensure that more than two seconds (or some other preselected time threshold interval value) has not elapsed since the initial receipt of signal 18. If this time has elapsed, step 50 is followed by step 52 in which controller 14 determines whether the "panic" signal is still being received. Alternatively, step 50 is followed by step 48 in which the counter is incremented to reflect the time between initial receipt of signal 18 and the time at which the counter will again be read at in step 50. If the signal is not still being received (i.e. the signal was received for a time period duration which was less than the selected threshold value), step 52 is followed by steps 54 and 55. Step 54 represents an initial or waiting state in which receiver 14 resides while awaiting receipt of another "panic" signal 18. Alternatively, step 52 is followed by step 56 in which visual alarm 58 and/or siren 33 become activated.

In this manner, as should be apparent to one of ordinary skill in the art, alarm 58 and/or sirens 33, 81 are activated only upon an intentional depression of transmitter switches 30 since intentional switch depression usually occurs for a time period, which is longer than the preselected time threshold interval. A "false" or unintentional generation of "panic" signals, caused by a momentary and unintentional depression of switches 30 will not cause alarm activation since the switches are depressed for a time that is normally less than the preselected threshold interval. To further decrease the probability of unintentional alarm activation, the preselected time interval may be increased as desired. Moreover, it should be apparent to those of ordinary skill in the art that transmitter 20 may be modified so as to produce signals 18, 74 only after a certain and predetermined time of continued switch depression thereby further reducing the probability of a false system activation. Moreover, in an alternate invention embodiment, controller 14 continually ascertains whether signal 18 is being received during the incrementation of counter 44 from its null initial value until it reaches the preselected threshold value. In this manner, intermittent or interrupted receipt of signal 18 will be identified and will cause no siren activation. As should be apparent to one of ordinary skill in the art from the foregoing discussion, the value of counter 44, in one embodiment, approximates the duration of time between an initial receipt of signal 18, by controller 14, and the current time at which the counter is read in step 50.

To further improve many of the deficiencies of prior vehicle security systems, an automatic system activation and deactivation feature is employed by the preferred embodiment of this invention. Specifically, many prior vehicle security systems become deactivated by the depression of switches 30, as vehicle owner/alarm system user 62 approaches vehicle 12. Such manual activation, as previously discussed, is cumbersome, inconvenient, and dangerous.

The operation of the automatic deactivation feature, of the preferred embodiment of this invention, is shown in flowchart 60 of FIG. 3. Specifically, in a first embodiment, the presence of the vehicle owner 62 is sensed by motion sensor 64, in step 66. Upon such presence sensing, sensor 64 generates an electrical signal to receiver 14 which is effective to cause receiver 14, in step 68, to generate signal 22 to transmitter 20. Upon receipt of signal 22, transmitter 20 provides an indication which allows owner 62 to determine that an automatic deactivation sequence is in progress. Such indication may be an audible signal or a flashing light 63. Step 70 is followed by step 72 in which transmitter 20 automatically generates a system deactivation signal 74 to receiver 14. It should be realized that controller 14 may, in an alternate embodiment, be configured so as to transmit signal 22 without receipt of a signal from sensor 64. In this manner, controller 14 continually attempts to be in a disarming communication relationship with an approaching transmitter 20.

As should be realized from the foregoing discussion, system 10 is automatically deactivated, thereby substantially obviating the need for a manual depression of switches 30 or manual intervention on the part of user 62. Moreover, it should be realized by one of ordinary skill in the art that substantially the same arrangement may be used to activate system 10 once a typical vehicle door 76 has been closed. Such a door closure is sensed by switch 24 and communicated to receiver/controller 14. Upon such communication, receiver 14 transmits signal 22 to transmitter 20, thereby causing transmitter 20 to generate signal 74 effective to activate system 10. In this manner, system 10 will become activated every time one or more of the doors 76 close thereby obviating the need for user 62 to "remember to activate system 10" upon departure from vehicle 12. It should be realized that during the previously-described system "deactivation", receiver 14 causes components 24, 26, 28, 29, 31, 33, 58, 64, and 81 to be inoperable while during system "activation" receiver 14 causes these components or elements to operate in the manner described and known to those of ordinary skill in the art. Moreover, in an alternate embodiment of the invention, transmitter 20 is modified to generate an automatic activation command to controller 14 in the event of a failure to receive signal 22 thereby ensuring automatic system activation even when the signal generating portion of controller 14 and/or door switch 24 becomes faulty.

Figure 4:
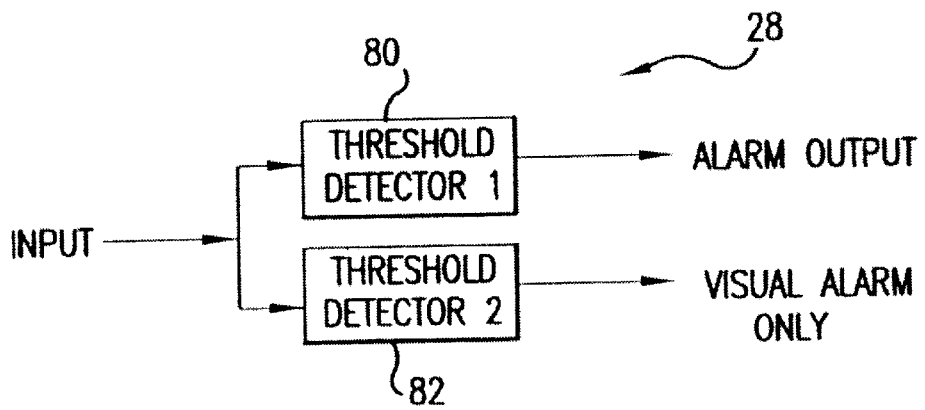
FIG. 4 is a block diagram of the light-touch sensor of the preferred embodiment of this invention as shown in FIG. 1.

To further increase the usefulness and functionality of many of these prior vehicle security systems, a "light-touch" sensor 28 is used, as best shown in FIGS. 1 and 4. Specifically, sensor 28 includes two threshold elements 80 and 82, each of which may be substantially identical to the comparators 286 shown in the '867 patent.

Specifically, detector 82 is adapted to provide an output signal (i.e. which may be used to activate or energize visual alarm 58 or other types of annunciators such as sirens 33, 81 for a brief time period) upon receipt of a motion detection signal which is below the threshold level of element 80, effective to provide a warning of the alarm's existence. Such a warning substantially reduces the probability of vehicle damage since the "would-be thief", being aware of the existence of the vehicle alarm, will normally seek other non-alarmed vehicles. Such a "warn away" signal could also comprise a low level audible tone from a second siren 81 or an alternate and low level audio output from siren 33 if a dual tone siren is employed. Should the received signal be above the normal threshold of detector 80, an alarm sequence occurs, described within the '867 patent. Such a dual threshold arrangement therefore substantially prevents "false" audible alarms by requiring a substantially strong detection signal to activate the audible alarms 33, 81 for a substantially long period of time.

As further shown in FIG. 1, system 10 includes a camera 29 which is adapted to be selectively activated by receiver 14, effective to take and acquire a number of pictures of the surrounding vehicle area upon the sensing of the existence of an "alarm" condition by system 10 (i.e. upon receipt of a signal from elements 24, 26, 28, 31, or 33 by controller 14). The area about which pictures are taken is dependent upon the placement of camera 29 within or upon vehicle 12 and upon the type of lens employed. Moreover, camera 29 may be adapted, as should be known to those of ordinary skill in the art, to transmit this video information to satellite 69 by means of signal 67 or to store the data for later retrieval. Alternatively, this video information may be digitized by a conventional charge coupled device assembly and later transmitted by use of a cellular telephone (not shown) or satellite 69 to a remote monitor or to home television or computer unit having a videocassette recorder assembly adapted to receive and record the photographed or detected events. In this manner, a visual record may be obtained of the vehicle intrusion for later evidentiary and suspect identification purposes.

Figure 5:
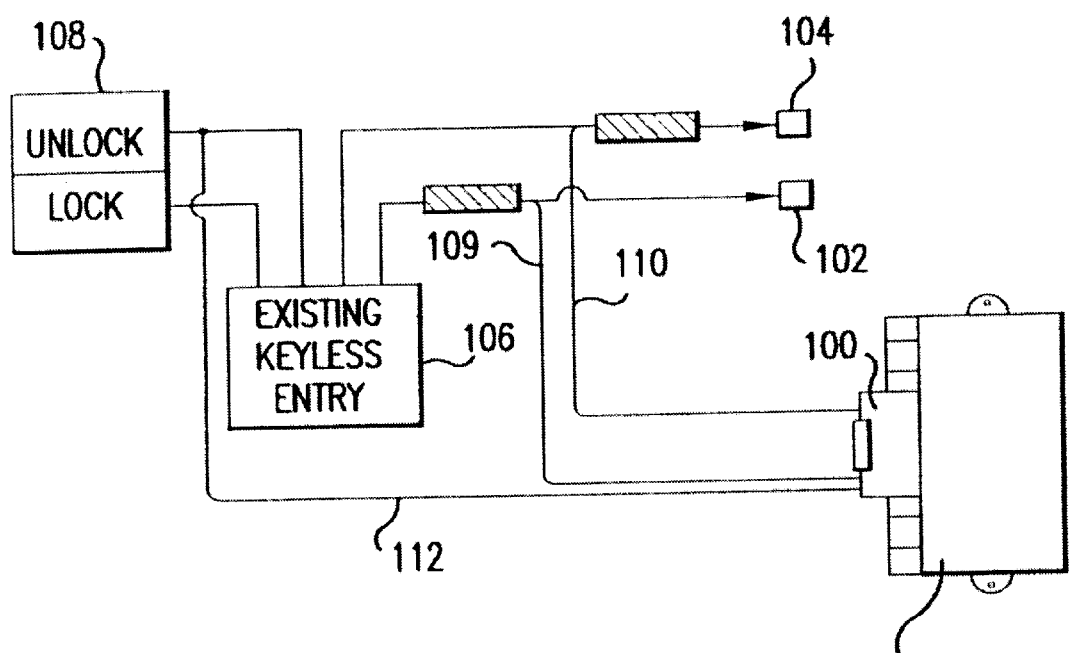
FIG. 5 is a block diagram of the vehicle security system of the preferred embodiment of this invention shown in assembled relation with an existing vehicle security system.

To further increase the functionality of many of the aforedescribed prior security systems, system 10, of the preferred embodiment of this invention and shown best in FIG. 5, further includes a communications interface terminal portion 100 which connects receiver/controller 14 to the control relays or actuators 102, 104 of an existing and commercially available keyless entry remote alarm system 106. System 106 may also comprise an alarm with a keyless entry vehicle security system.

As shown, existing system 106 is normally coupled to the vehicle lock and unlock switch 108. Specifically, wire 110, which is normally coupled to the door lock motor, provides a positive voltage or ground when the existing system 106 unlocks the driver's door 76. Wire 110, in the preferred embodiment of this invention, is identified and coupled to interface 100, while wire 109 which locks the driver's door 76 is also identified and separately coupled to terminal 100. In this manner, system 10 (i.e. receiver/controller 14) is adapted to determine the correct polarity of any existing door lock circuit and may be used in combination with an existing keyless entry system 106 in order to provide additional security functionality.

Moreover, terminal 100 may also be adapted to provide a standard or conventional communications interface (i.e. to encode data transmitted from receiver/controller 14 to a desired format and to decode data destined for receiver/controller 14, effective to allow the data to be received and recognized by controller 14) to existing and commercially available vehicle multiplex communications systems. Lastly, to further hinder unauthorized system deactivation, wire 112, in one embodiment of this invention, is coupled to terminal 100 in order to ensure that system 10 becomes deactivated only upon a depression of the disarm switch 31 or upon the combination of the activation of keyless entry transmitter 20 and a sensed unlock door state in order to prevent an unauthorized unlocking which may be effective to disable the alarm system 10. Moreover, in one embodiment of this invention, if wires 109, 110 are not connected or are floating, controller 14 enters a predetermined system arming/disarming mode such as automatically arming system 10 after a certain period of time passes after vehicle exit is made from door 76.

System 10 of the preferred embodiment of this invention also includes a tertiary audio generator 120 (i.e. a typical vehicle horn or siren) which is coupled to receiver 14 and which becomes activated (i.e. emitting sound) when the primary audio generators 33, 81 have been disconnected from the receiver. In this manner, system 10 provides audio generation in spite of unwanted system tampering.

Figure 7:
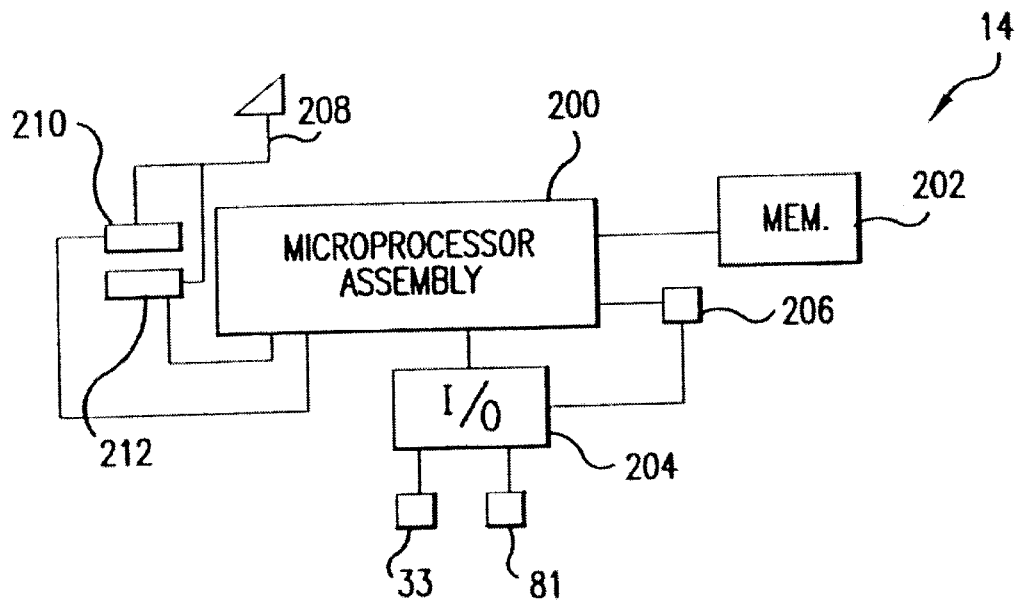
FIG. 7 is a block diagram of the controller shown in FIG. 1.

To further understand the vehicle security system of the invention, reference is now made to FIG. 7 where there is shown one embodiment of the receiver/controller 14 made in accordance with the teachings of this invention. As shown, receiver/controller 14 includes a microprocessor assembly 200 which is coupled to a memory 202 containing a stored software program. As shall be apparent to one of ordinary skill in the art, the stored program defines the operations which microprocessor 200 is to perform. Moreover, assembly 200 may include a conventional and commercially available microprocessor such as the Model Number 68000 or Model 6805, which are both manufactured by Motorola of Schaumburg, Ill.

Receiver/controller 14 further includes a conventional input/output portion 204 having a short circuit detect portion 206. Portion 204 is coupled to elements 24, 26, 28, 29, 31, 58, 64, 33, 81, and 120 and provides a physical interface between these elements and assembly 200. Microprocessor assembly 200 includes an antenna assembly 208 which is adapted to receive signals 18 and 74 and which is further adapted to allow signal 22 to be transmitted from controller 14. It should be apparent to one of ordinary skill in the art that antenna assembly 208 includes a signal modulation portion 210 and a signal demodulation portion 212 which respectively modulate signal 18 and demodulate signals 22 and 74.

Referring now to FIGS. 9, 10, 12, 13, and 15 there are shown various embodiments of motion or shock sensor assembly 64. Specifically, in a first shock sensor embodiment (shown in FIG. 9), assembly 64 includes a stationary electrical coil assembly 220 which is coupled to a movable magnet 222 by a spring or other type of flexible or compressible coupling member 224. As shown, assembly 220, magnet 222, and member 224 are housed within a container 226. In operation, the movement of magnet 222 (i.e. caused by motion or shock applied to container 226) varies the amount of magnetic flux impressed upon or communicated to coil 220, thereby varying the output current signal 228. Variations in signal 228 may then be used to appropriately detect motion or shock imparted to the vehicle 10. Moreover, the amplitude of output signal 235 may also be used to gauge the amount of shock imparted to sensor 64 (i.e. a large shock causes a signal having a relatively large amplitude to be generated).

In a second motion detection assembly embodiment 64' (shown in, FIG. 10) a light source 230 is stationarily deployed within a container 232. The source is transversely and communicatively deployed in relation to an optical receiver 234. As shown, receiver 234 is also stationarily disposed within container 232. Between source 230 and receiver 234 there is deployed an opaque member or bar 236 which is movably coupled to the bottom portion of housing 232 by means of a spring or other compressible member 238.

In operation, light 240, emanating from source 230, is absorbed or reflected by member 236 before reaching receiver 234. When shock or motion is applied to assembly 24' (i.e. to container 232), member 236 is moved perpendicularly to the direction of light signals 240, thereby allowing signals 240 to be received by receiver 234. The reception of these signals causes a current signal 242 to be output from receiver 234 indicating the presence of motion in close proximity to assembly 64'. The amount of light reaching receiver 234, in one embodiment of the invention, is directly proportional to the amplitude or strength of the output signal 242. Thus, the strength of signal 242 may be used to gauge the amount of light received by receiver 234 and to the amount of shock imparted upon container 232 since the amount of light received by receiver 234 is also directly proportional to the amount of shock force applied to container 232 (i.e. a large shock moves member 236 toward the top of container 238, thereby allowing a large amount of light from reaching receiver 234).

Figure 12:
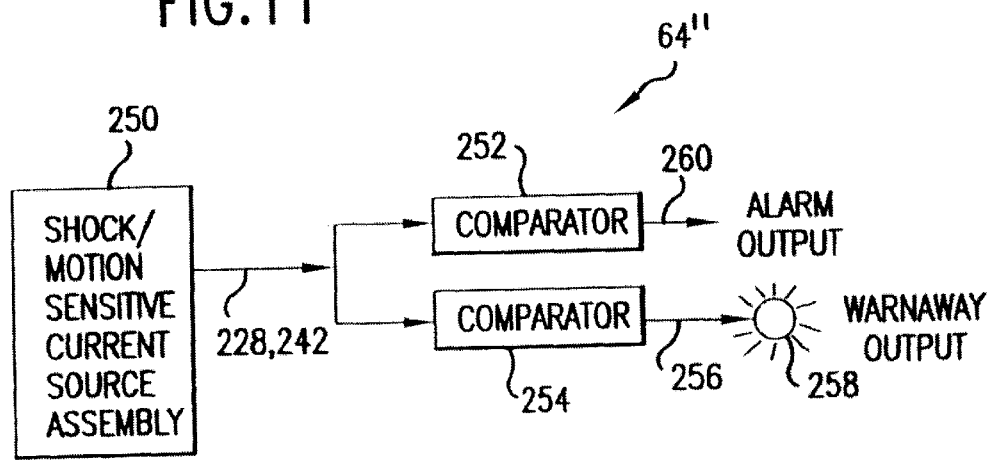
FIG. 12 is a block diagram of a third shock sensor made in accordance with the teachings of this invention.

Referring now to FIG. 12 there is shown a third shock sensor embodiment 64' made in accordance with the teachings of this invention. As shown, sensor assembly 64' includes a motion sensitive current source assembly 250 which may be substantially similar to the previously-described shock sensor assembly 64 or 64'. Specifically, in this embodiment, the current signal output 242, 228 is input to comparator assemblies 252, 254, each of which compare the amplitude of these signals 228, 242 with a previously selected and stored amplitude value. In the preferred embodiment of this invention, the stored value within comparator 252 is made to be substantially less than the value stored within comparator 254. In this manner, comparator 254 will output a signal 256 in response to relatively low amplitudes of signals 228, 242. This signal 256 is used as a "warn away output".

In this "warn away state" none of the alarm elements are activated. However, such a "warn away output" may activate a light 258, other non-audible enunciators, or audible annunciators for a brief period of time in a manner which is adapted to warn a potential intruder away from vehicle 10. Should the amplitude of signals 228, 242 be of a substantially high nature (indicating an actual intrusion or attempted intrusion into vehicle 10) comparator 254 will produce a signal 260 which, when received by controller 14, is effective to force controller 14 to provide or activate the siren or other audible alarm elements. It should therefore be apparent to one of ordinary skill in the art that the use of a "warn away output" allows for a passive or non-audible intrusion warning system thereby obviating the need for an audible output signal to simply warn away a potential intruder. Moreover, in another embodiment of this system each comparator 252, 254 may be selectively deactivated by controller 14 (i.e. have a threshold value of zero) if it is desired for system 10 to provide an indication of all motion producing an output signal from detector 64 or 64'.

Figure 13:
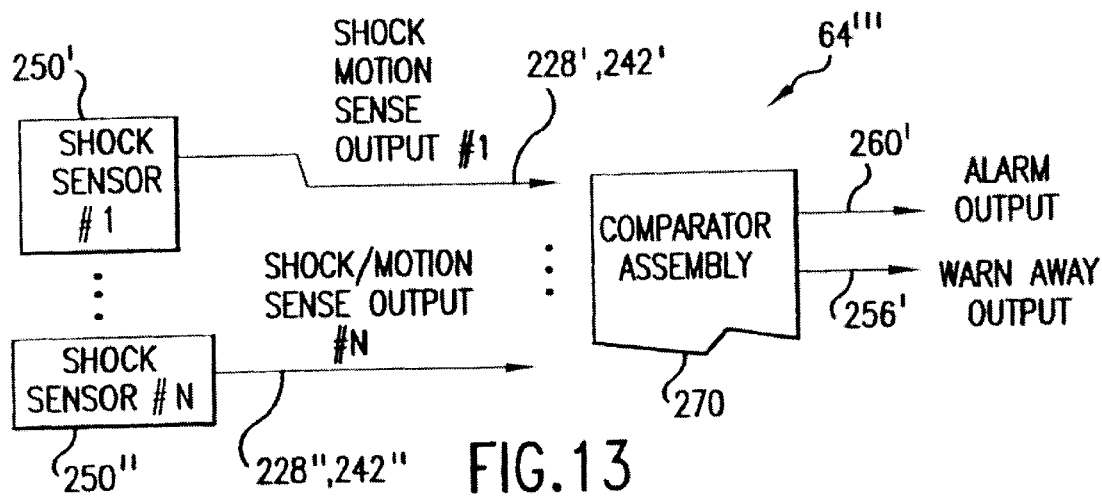
FIG. 13 is a block diagram of a shock sensor voting assembly made in accordance with the teachings of this invention.

Referring now to FIG. 13 there is shown a fourth shock sensor assembly embodiment 64''' made in accordance with the teachings of this invention. As shown, assembly 64''' includes a number of shock sensor assemblies 250', 250'' having their respective output signals 228', 228'', 242' and 242'' coupled to a comparator assembly 270. In this shock sensor embodiment, assembly 270 is adapted to produce an alarm output signal 260' and a "warn away output" signal 256' only when a certain predetermined number of sensors 250', 250'' produce respective output signals 228', 228'', and 242', 242''. In this manner, comparator assembly 270 tabulates the received "voted signals" and produces an output signal only when the vote is of a sufficient strength (i.e. a predetermined number of sensors have "voted" that motion was detected), thereby reducing the probability of a false alarm output.

Referring now to FIG. 15, there is shown a fifth shock sensor embodiment 64'''' made in accordance with the teachings of this invention. Specifically, assembly 64'''' includes a shock/motion sensitive current source assembly 250' (which is substantially identical to assembly 250 shown in FIG. 12). The output signals 228' and 242' are coupled to a potentiometer 280 before they are input to comparators 252' and 254', which are respectively and substantially identical to comparators 252 and 254 shown and described with reference to FIG. 12.

In this manner, potentiometer 280 selectively reduces the amplitude of signals 228' and 242' in order to allow, a user of system 10 to adjust or to set the sensitivity of shock sensor assembly embodiment 64''''. A large amplitude reduction, produced by potentiometer 280, decreases the sensitivity of the motion and shock assembly 64'''' (i.e. a higher input signal amplitude is needed to cause corresponding activation). In this manner, a user may allow only very strong signals from producing a motion alarm or "warn away" output signal and corresponding indication.

In an alternate embodiment, as shown in FIG. 15, potentiometer 280 is coupled to an antenna 282 and receiver and demodulator assembly 284 (which may be substantially similar to receiver 14 shown in FIG. 7). In this embodiment, a signal (such as 18 or 74 emanating from transmitter 20) is received by antenna 282, demodulated by portion 284, thereby producing a signal 286 which is coupled to potentiometer 280 and which is adapted to cause potentiometer 280 to "pad" or reduce the amplitude of signals 228' and 242' by a certain amount specified by the received signal 18, 74. In this manner, a user of system 10 may remotely set or specify the desired sensitivity associated with the shock and motion assembly 64''''.

It should be realized by one of ordinary skill in the art that the output short circuit detection and protection portion 206 is used by receiver/controller 14 to detect the occurrence of a short circuit at each component position of the input/output portion 204 so as to prevent system damage and to alert microprocessor assembly 200 of the potential inoperability of a shorted or failed component. That is, portion 204 includes several substantially identical circuits, each of which is coupled to a unique position of portion 204, corresponding to the position at which one of the alarm components is physically attached to portion 204. In this manner, each component, connected to portion 204, may be monitored for the existence of a short circuit condition.

Figure 14:
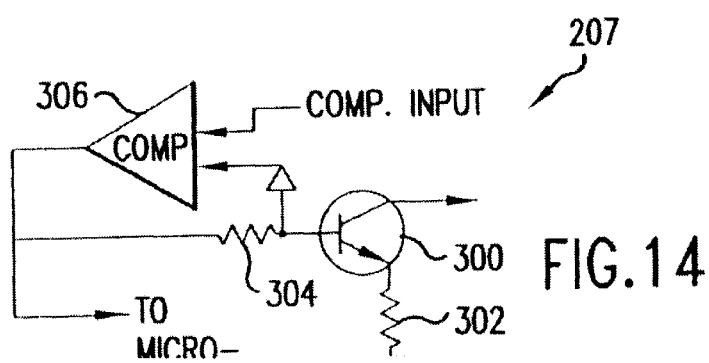
FIG. 14 is an electrical schematic of the short circuit output detection device shown in FIG. 7.

Referring now to FIG. 14 there is shown an electrical schematic diagram of one of the output short circuit protection circuits 207, used by portion 206. Specifically, circuit 207 includes a conventional bipolar transistor 300 having its emitter terminal coupled to electrical ground through a resistor 302 and its collector terminal coupled to one position of input/output portion 204. Moreover, the base terminal of transistor 300 is coupled through a resistor 304 to the output of a comparator 306 and is further coupled to the input of comparator 306 through its base terminal.

Comparator 306 is adapted to receive a comparator input value (from receiver/controller 14) and to compare the voltage of the base terminal of transistor 300 with the comparator input value. In this manner, the base voltage of the transistor is continually monitored in order to determine whether a short circuit condition has occurred at one of the output elements When the base voltage, which mirrors the collector voltage, goes to a relatively high value, thereby indicating a shorted condition, microprocessor assembly 200 is adapted to deactivate the shorted alarm element from the system, thereby preventing false alarm activation and to prevent damage to assembly 200 caused by voltage or power overload which occurs as a result of the detected short circuit. It should be apparent to one of ordinary skill in the art that values of resistors 302, 304 and the initial value which is input to comparator 306 may vary and are user selectable.

Referring now to FIG. 16, there is shown an alternate vehicle alarm system 320 made in accordance with the teachings of this invention. In the embodiment shown in FIG. 16, controller 14' is coupled by a conventional automotive power bus 322 to a siren assembly 324, gas cap assembly 326, and shock sensor assembly 328. It should be appreciated that assemblies 324, 326, and 328, in one embodiment of this invention, are substantially and respectively identical to elements 33, 81, door switch 24, and motion sensor 64 with the addition of a conventional and commercially available power bus data encoder/decoder attached or electrically coupled thereto.

In this manner, controller 14 (which also includes a commercially available power bus encoder/decoder) communicates by a conventional power bus modulation and encoding scheme to assemblies 326, 328, and 324 without the need for additional wiring throughout vehicle 12. It should be realized by one of ordinary skill in the art that the other previously-described alarm activation elements may similarly be coupled to bus 322 in this manner. Moreover, in this embodiment assembly 324 further includes a timer 330 which is adapted to continually count or record the passage of time from the release of assembly 324 from the manufacturing facility, thereby allowing a service provider to ascertain the amount of time that siren assembly 324, and presumably system 10, have been in service. Such service time information is useful in order for the provider to determine whether the system is under warranty.

Figure 6:
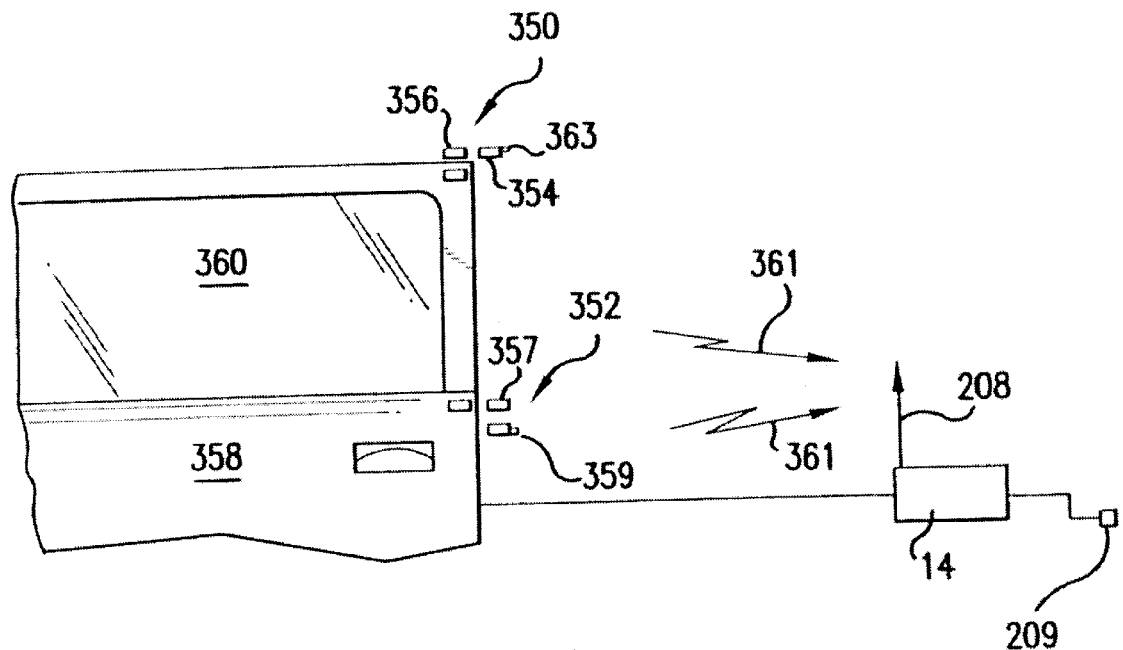
FIG. 6 is a block diagram of the vehicle alarm system of the preferred embodiment of this invention shown utilizing a surface of a vehicle as an antenna.

Referring now to FIG. 6, there is shown a pair of remote alarm activation elements 350, 352 made in accordance with the teachings of this invention and shown in wireless communication with receiver/controller 14 as shown in FIG. 7 and previously described. It should be realized that each of the elements 350, 352 may be substantially identical to receiver/controller 14. Moreover, electric coil pairs 354, 356 and 357, 359 are in mutual electrical flux communication and are coupled to the respective input/output portion of elements 350, 352. Each pair has a first coil on the stationary automobile frame and a second coil on the movable door or window.

Should door 358 or window 360 be moved from their closed position (i.e. thereby interrupting the flux which is communicated between the coil pairs) a signal 361 is transmitted from each element 352, 354 to receiver/controller 14. Signal 361 informs controller 14 of the occurrence of such a "door opening" event. Such wireless communication thereby obviates the need for a power bus communication scheme or for dedicated wiring to occur between these elements 350, 352 and controller 14. Moreover, in the preferred embodiment of this invention, each assembly 352, 354 is powered by means of electric batteries 359, 363 which are contained in a battery clip housing. It should therefore be realized that each of the other alarm elements 28, 29, 31, 33, 58, 64, and 81 may similarly utilize remote and portable batteries.

As shown best in FIG. 6, antenna 208 may be replaced by the metal surface 358 of automobile 12. In this arrangement, surface 358 is electrically coupled to the modulator and demodulator portions of controller 14, and replaces antenna 208. In this arrangement, the metallic surface of the vehicle is used as a radiator of electromagnetic energy which is received from controller 14 and is further used to receive electromagnetic energy which is coupled to receiver 14.

As further shown in FIG. 6, controller 14 also includes a commercially available photocell 209 which produces a signal in the absence of light impinging on it. The produced signal is communicated to controller 14 and is used to reduce or eliminate chirping audio output signals (such as those described in the '867 patent) during the evening hours. Moreover, such a received signal may also be used to effect system activation, deactivation, or other types of element activation.

Figure 8:
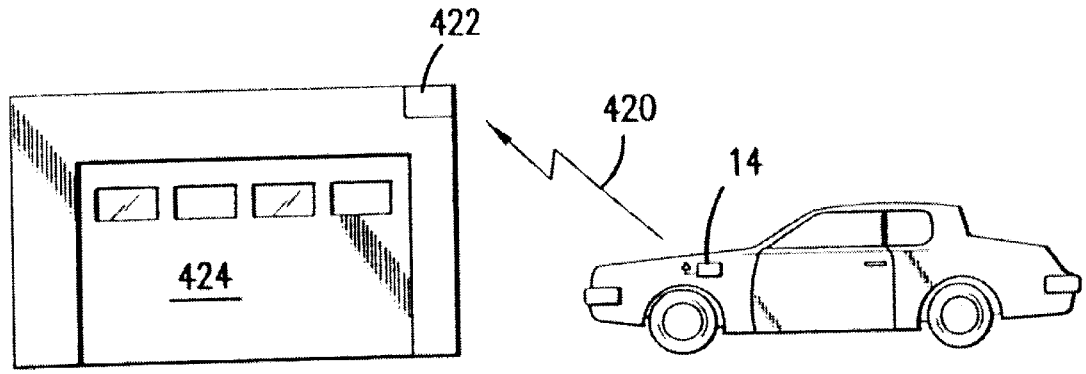
FIG. 8 is a block diagram illustrating a remote garage door activation by the vehicle security system of the preferred embodiment of the invention.
Figure 9:
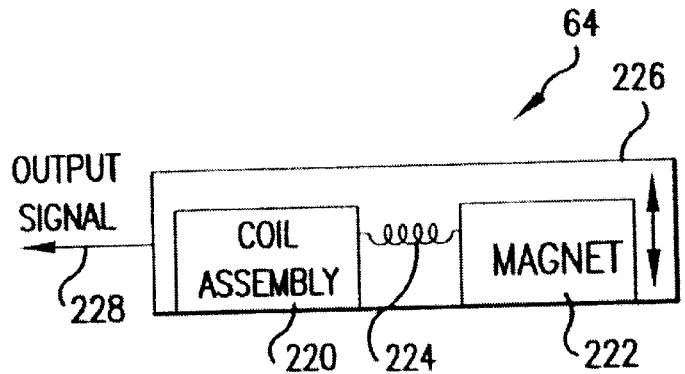
FIG. 9 is a block diagram of a shock sensor made in accordance with the teachings of this invention.
Figure 10:
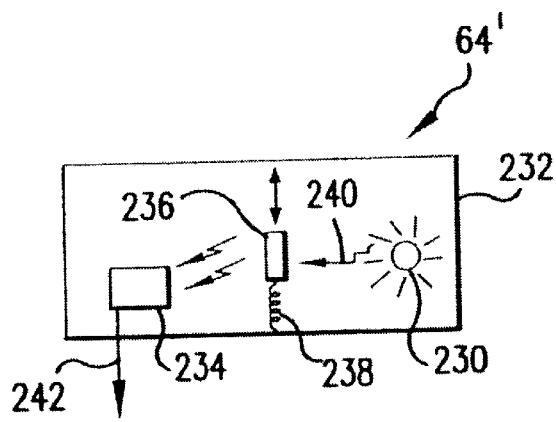
FIG. 10 is a block diagram of a second shock sensor made in accordance with the teachings of this invention.
Figure 21:
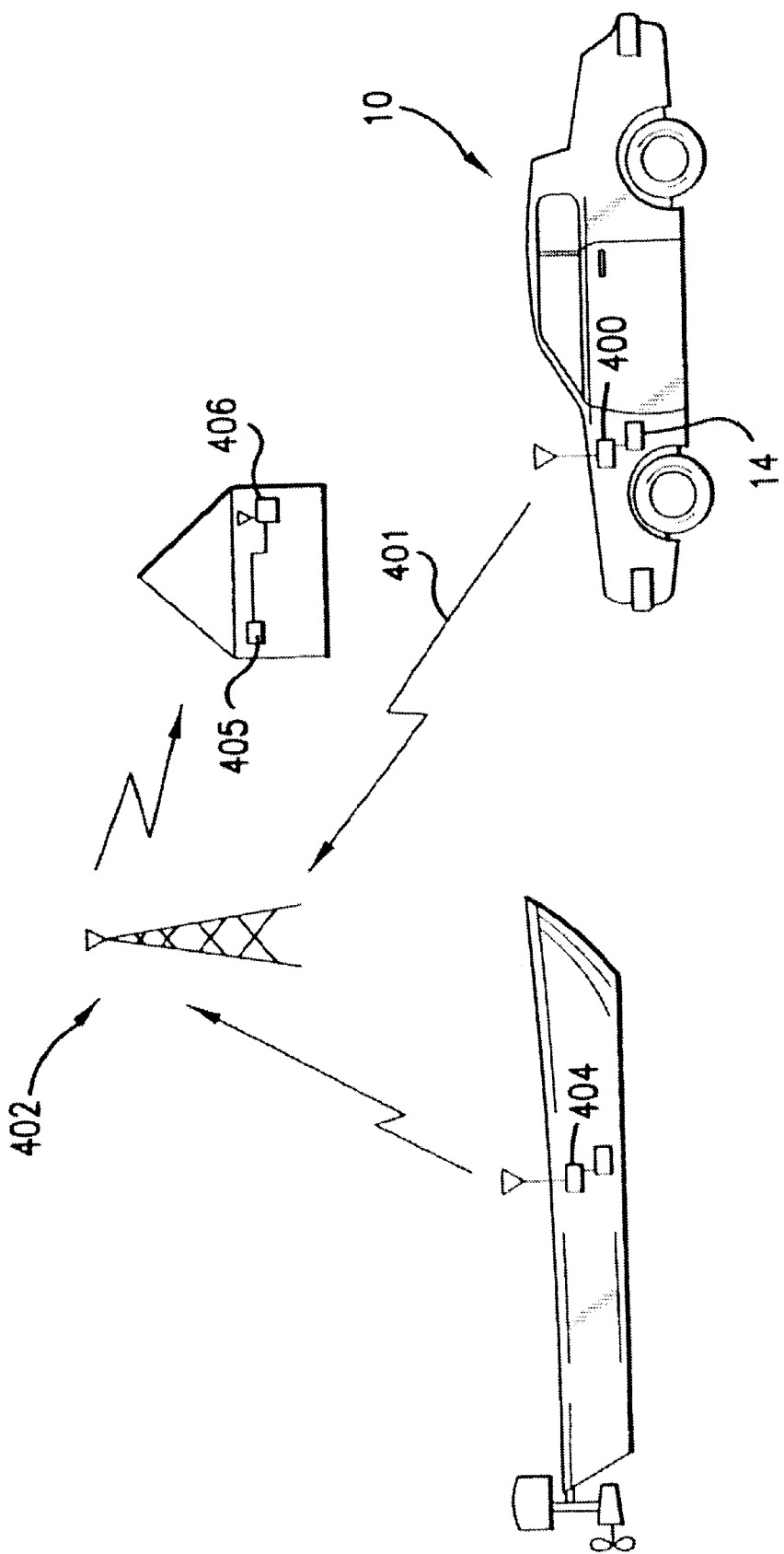
FIG. 21 is a block diagram illustrating electromagnetic communication between the vehicle security system of the preferred embodiment of the invention and a boat, a home security system, and a conventional cellular telephone exchange.
Figure 22:
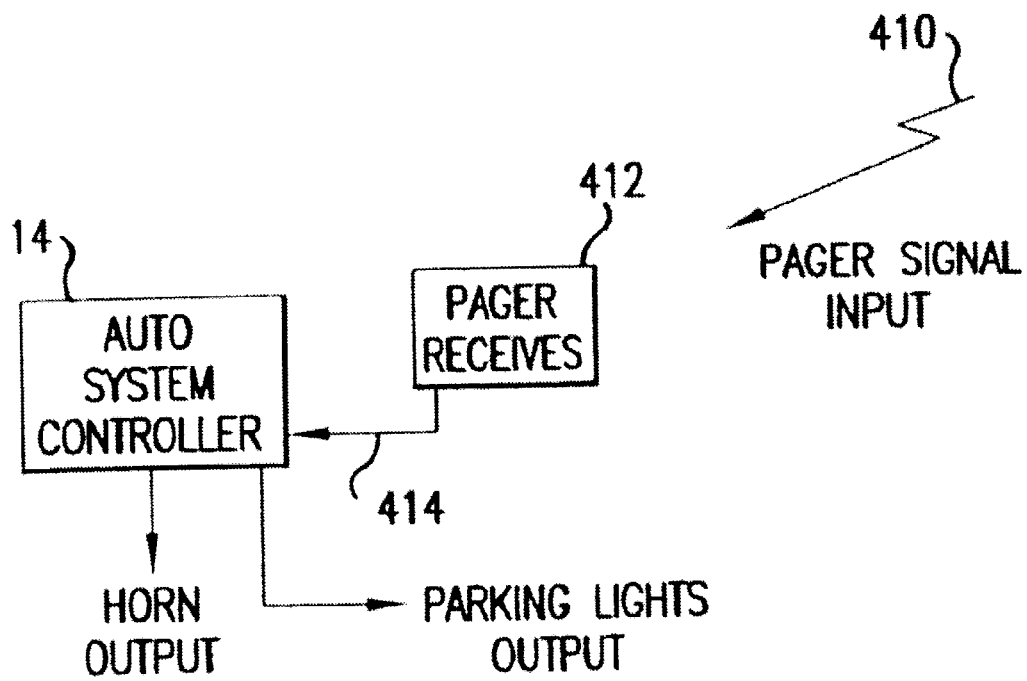
FIG. 22 is a block diagram illustrating electromagnetic communication between the vehicle security system of the preferred embodiment of the invention and a conventional electromagnetic paging system.

Referring now to FIGS. 8, 21, and 22 there is shown various communications configurations of auto security system 10 made in accordance with the teachings of this invention.

Figure 11:
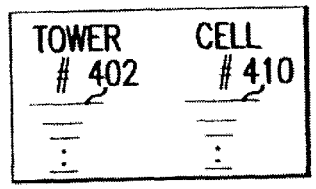
FIG. 11 is a table illustrating certain and conventional cellular telephone reception towers and their uniquely corresponding cells, the table being adapted for use in combination with the vehicle security system of the preferred embodiment of this invention.

Specifically, system 10 may include a commercially available and conventional cellular telephone 400 which is adapted to be coupled to controller 14 and to receive and generate signals 401 to a typical cellular telephone receiving station 402 (see FIG. 21). These signals 401 may then be retransmitted to a cellular telephone 404 located on a boat or to a cellular telephone 405 which is part of a commercially available home security system 406. In this manner, upon an automotive alarm activation, controller 14 may generate a signal 401 to station 402. The physical location of station 402 may be stored in a computer and made to correspond to a specific cell 410 (as shown in FIG. 11). The tower and cell relationship may then be used to activate a conventional locating beam in order to allow police and other local authorities to locate the stolen automotive vehicle.

Moreover, as shown in FIG. 22, system 10 may include a commercially available radio or telephone pager 412 which is adapted to receive a paging signal 416. Receiver 412, upon receipt of signal 410, issues or generates a signal 414 to controller 14. Upon receipt of signal 414, controller 14 activates a horn or parking lights in order to allow attention to be drawn to the stolen vehicle. In this manner, one may selectively and remotely activate certain of the elements 24, 26, 28, 29, 31, 58, 33, 81, 64 when the vehicle has been stolen.

As shown in FIG. 8, receiver/controller 14 may also be adapted to generate a signal 420 which, when received by a typical garage door controller 422, is effective to open the garage door 424. It should therefore be obvious to one of ordinary skill in the art that system 10 is adapted to provide a variety of communications configurations and interfaces to various existing communications and security systems.

Referring now to FIGS. 17, 18, 19, and 20 there is shown a siren 450 made in accordance with the teachings of this invention and substantially identical to sirens 33, 81, and 120.

Specifically, horn/siren 450 includes a first outer flanged hollow portion 452 coupled to an electrical power source 453, and an inner and generally tubular shaped movement and sound producing portion 454 which is adapted to be movably contained within hollow outer portion 452 by use of member 451. As shown, portion 454 has a screw or mounting member reception portion 455 which receives a threaded mounting member 457. Moreover, member 457 is coupled to a screw or second mounting member 459. In this manner, members 457 and 459 cooperate to mount portion 454 within portion 452.

Figure 19:
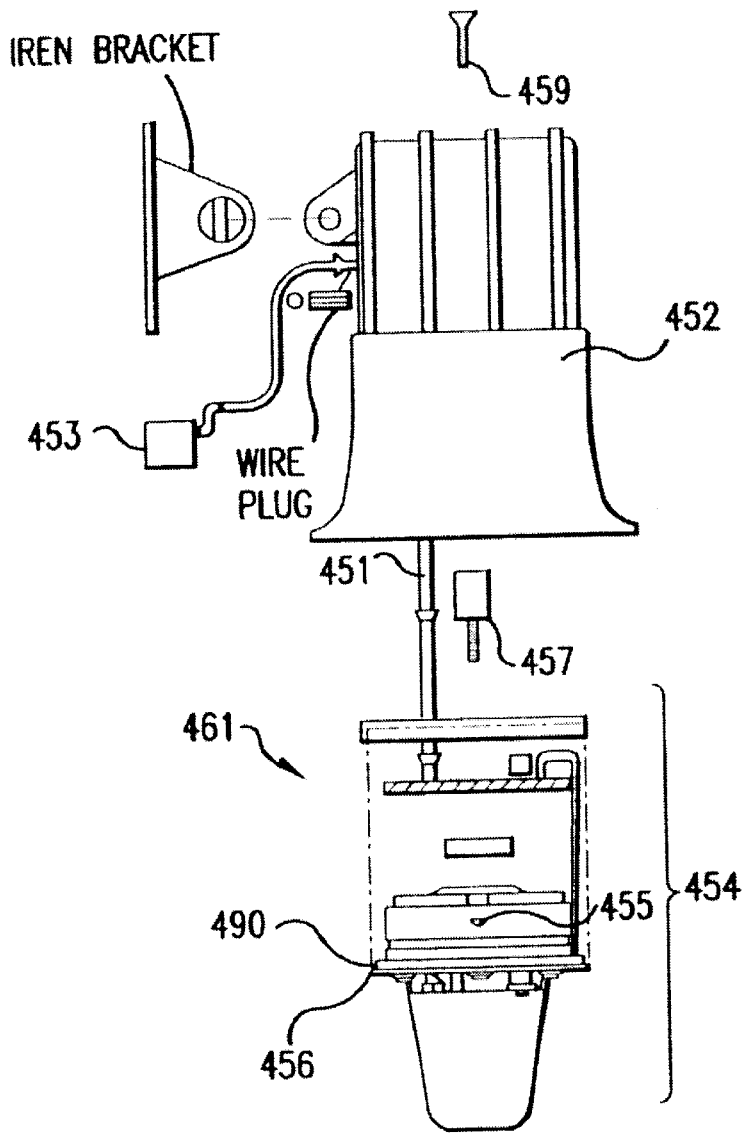
FIG. 19 is an assembly view of the siren shown in FIGS. 17 and 18.
Figure 20:
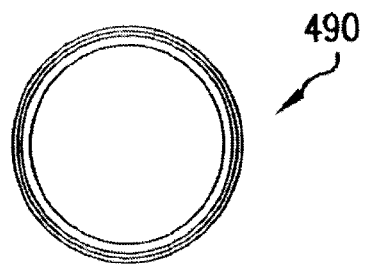
FIG. 20 is a top view of the gasket shown in FIG. 19.

As shown best in FIGS. 19 and 20, portion 454 further includes a generally circular and outwardly extending stepped or raised, portion 456 upon which gasket or seal 490 seats. It should therefore be apparent to one of ordinary skill in the art that flanged portion 456 cooperates with gasket 490 to provide a substantially air-tight seal thereby preventing moisture and other contaminants from entering or adhering within the diaphragm portion 461 of portion 454 which is contained within portion 452.

Figure 23:
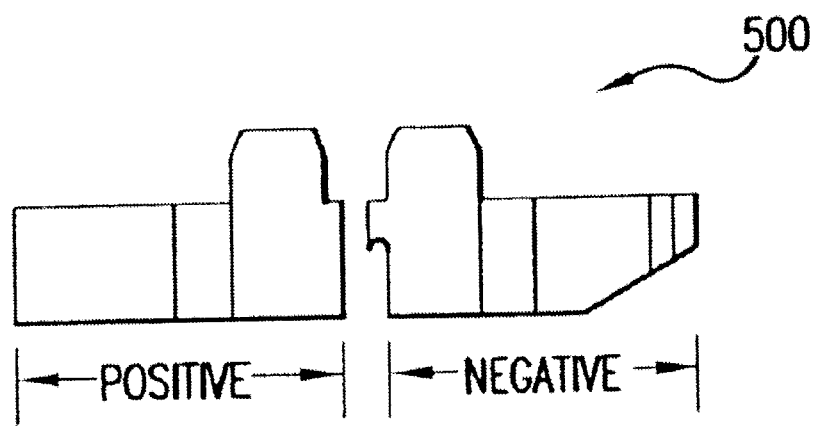
FIG. 23 is a side view of a battery receptacle made in accordance with the teachings of this invention.
Figure 24:
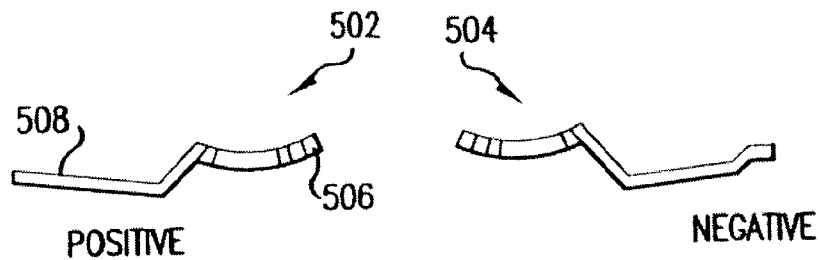
FIG. 24 is a top view of the receptacle shown in FIG. 23.

As shown best in FIGS. 23 and 24 there is shown a battery containment clip 500 made in accordance with the teachings of this invention and used by elements 352, 354 of system 10. Specifically, clip 500 includes a substantially identical positive and negative clip or battery retention portions 502 and 504, each having an arcuate portion 506 coupled to a generally L-shaped member 508. L-shaped member 508 cooperates with arcuate member 506 to provide a secure surface upon which a typical battery may reside and provides for or reduces the probability of power interruption due to a dislodgement of the battery from clip 500. Such clips are used by controller 14 and all other elements requiring battery power.

Figure 25:
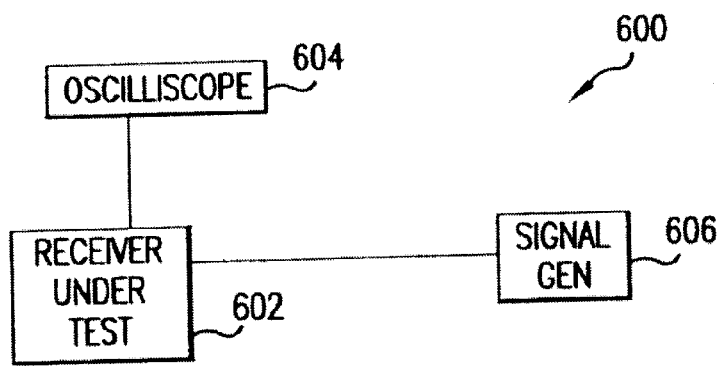
FIG. 25 is a block diagram of a test assembly made in accordance with the teachings of this invention and used for tuning and verification testing.

Referring now to FIG. 25, there is shown a test arrangement 600 made in accordance with the teachings of this invention and used for frequency tuning and frequency verification of one or more of the receiver/controllers 14.

As shown, receiver 602 (substantially similar to controller 14) is tuned to a certain frequency by use of an oscilloscope 604 and generator 606. The steps involved in the receiver, tuning, and testing verification are as follows:

TUNING (1) Connect the receiver under test 602 (comprising a commercially available receiver manufactured by the Code Alarm Company of Madison Heights, Mich. and referred to as Model SR-1 to oscilloscope 604 and to signal generator 606.

(2) Press the 'SEQ' button on signal generator until 314.2 MHz, 500M volts (1 KHz interval amplitude modulated 99%). is displayed on oscilliscope 604.

(3) Turn both tuning coils on the SR-1 fully counter-clockwise.

(4) Adjust "L1" (left tuning coil) in a clockwise direction, about two turns downward.

(5) Adjust "L2" (right tuning coil) and "L1" until the receiver responds or is activated by the signal from generator 606.

(6) Press the 'SEQ' button on signal generator until a signal of about 314.2 MHz, −127 dbm is displayed on oscilliscope 604.

(7) If more than about five noise pulses are present and viewed by oscilliscope 604, turn "L2" clockwise until the noise pulses are reduced in number to about one to four.

(8) Press the 'SEQ' button on the signal generator until a signal of about 314.3 MHz, 10m volts (hi ext. mod. 99%) is displayed on the oscilliscope 604. Adjust "L2" until the signal is present and received by receiver 602.

(9) Press the 'SEQ' button on signal generator until a signal of about 314.1 MHz, 10m volts (hi ext. mod. 99%) is displayed. Adjust "L1" until the signal is present and received by receiver 602.

VERIFICATION (1) Connect the receiver under test 602 to oscilliscope 604 and to signal generator 606.

(2) Press the 'SEQ' button on signal generator until a signal of 314.2 MHz, 500m volts (1 KHz int. am mod. 99%) is displayed. Verify receipt of the signal by receiver 602.

(3) Press 'SEQ' button on signal generator until 314.2 MHz, 10m volts (hi ext. mod. 99%) is displayed. Verify receipt of the signal by receiver 602.

(4) Press the 'SEQ' button on signal generator until 314.1 MHz, 10m volts (hi ext. mod. 99%) is displayed. Verify receipt of the signal by receiver 602.

(5) Press the 'SEQ' button on signal generator until 314.3 MHz, 10m volts (hi, ext. mod. 99%) is displayed. Verify receipt of the signal by receiver 602.

(6) Press the 'SEQ' button on signal generator until 314.2 MHz, −127 dbm is displayed.

Figure 26:
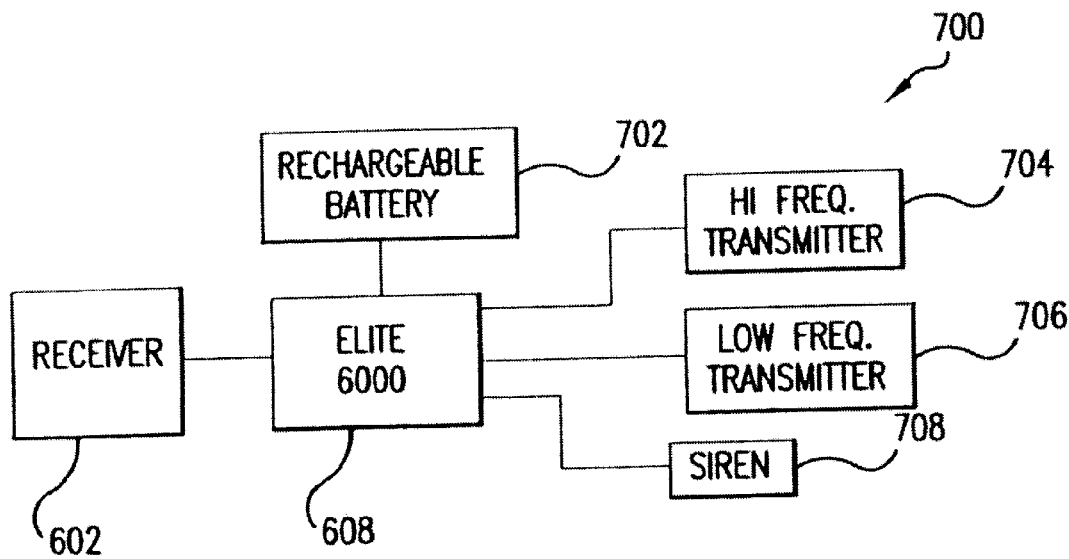
FIG. 26 is a block diagram of a test assembly made in accordance with the teachings of this invention and used for frequency range testing.

Referring now to FIG. 26, there is shown a test arrangement 700 which is used in the frequency range testing methodology of the preferred embodiment of this invention.

As shown, the receiver under test 602 is coupled to a testing board 608 which is manufactured by the Code Alarm Company of Madison Heights, Mich., which is commercially available, and which is referred to as an "Elite 6000". Testing board 608 is coupled to a rechargeable battery 702, to a high frequency transmitter 704, to a low frequency transmitter 706, and to a siren 708.

RANGE TEST

The steps associated with range testing are as follows:

(1) Couple battery 702 to board 608, thereby causing siren 708 to emit an audible sound.

(2) Remove board 602 and separately and sequentially couple three receiver units to board 608, each being used to verify that transmitters 704 and 706 operate from a distance of approximately 100 feet.

(3) Couple the receiver to be tested to board 608.

(4) Activate transmitter 704.

(5) Activate transmitter 706.

(6) Verify that the receiver to be tested is activated by transmitters 704 and 706.

It should therefore be apparent that the vehicle security system 10 of this invention provides increased functionality over prior systems. Moreover, it is to be understood that the invention is not limited to the exact construction or method illustrated and described above, but that various changes and modifications may be made without departing from the spirit and scope of the invention as set forth in the following claims.

Moreover, it should also be realized that transmitter 20 may be used to remotely and electromagnetically place controller 14 into a predefined operating state or set various operational parameters associated with the stored program in memory 202. For example, transmitter 20 may disable/enable siren chirping, allow all doors to be locked when the ignition is activated (automobile started), allow controller 14 to provide an output signal during an alarm condition which may be used externally of system 10 in any desired manner, as well as disable/enable certain of the previously-described alarm elements. This feature adds further functionality to the system.

In the claims:

1. A vehicle security system comprising:

a shock sensor, adapted to generate an output signal having said amplitude proportional to the amount of shock imparted upon said vehicle;

a primary alarm element;

a secondary alarm element;

a first comparator for receiving said signal and for comparing said amplitude to a first value stored in said first comparator, and adapted to generate a first output only if said amplitude is greater than said first value;

a second comparator for receiving said signal and comparing said amplitude to a second value stored in said second comparator, and adapted to generate a second output only if said amplitude is greater than said second value; and a controller adapted to receive said first and second output and to activate said primary alarm in response to said first output and to generate said secondary alarm in response to said second output.

2. A motion sensor adapted for use in a vehicle security system and adapted to detect motion imparted upon said vehicle, said motion sensor comprising:

a motion sensitive current source adapted to generate a signal having an amplitude proportional to the amount of motion imparted upon said vehicle; and a plurality of comparators, each of said plurality of comparators being adapted to receive said signal, compare the amplitude of said signal with a predetermined value and generate an output only if the value of said amplitude is greater than said predetermined value.

* * * * *